US011951497B2

(12) United States Patent
Donnelly et al.

(10) Patent No.: US 11,951,497 B2
(45) Date of Patent: Apr. 9, 2024

(54) TRIGGER SPRAYER ASSEMBLY WITH IMPROVED ASSEMBLY PROCESS

(71) Applicants: Market Ready, Inc., Round Lake Park, IL (US); Cupcake LLC, New York, NY (US)

(72) Inventors: Brandon Donnelly, New York, NY (US); Kyle Hansen, Hartland, WI (US); Alan Gormley, Blessington (IE); Milan-Bob Patadlas, Talisay (PH); Michael Sawant, Lake Forest, IL (US)

(73) Assignees: Market Ready, Inc., Round Lake Park, IL (US); CupCake LLC, New York, NY (US)

( * ) Notice: Subject to any disclaimer, the term of this patent is extended or adjusted under 35 U.S.C. 154(b) by 0 days.

(21) Appl. No.: 17/712,500

(22) Filed: Apr. 4, 2022

(65) Prior Publication Data

US 2022/0314254 A1 Oct. 6, 2022

Related U.S. Application Data

(60) Provisional application No. 63/170,688, filed on Apr. 5, 2021.

(51) Int. Cl.
*B05B 11/10* (2023.01)

(52) U.S. Cl.
CPC ....... *B05B 11/1057* (2023.01); *B05B 11/1011* (2023.01)

(58) Field of Classification Search
CPC ............ B05B 11/1074; B05B 11/1077; B05B 11/0008; B05B 11/1057; B05B 11/1011
See application file for complete search history.

(56) References Cited

U.S. PATENT DOCUMENTS

| | | | |
|---|---|---|---|
| 4,257,539 | A | 3/1981 | Cary et al. |
| 5,211,315 | A | 5/1993 | Geier |
| 5,366,121 | A | 11/1994 | Foster et al. |
| 5,749,501 | A | 5/1998 | Maas et al. |

(Continued)

OTHER PUBLICATIONS

Video entitled "Spray Pump Assembly", available at https://www.youtube.com/watch?v=rdkn4gXhUcg> (Wibro Feed Tech & Automation Centre Pvt Ltd.) Dec. 1, 2017, entire document, especially 2:00 to 2:58.

(Continued)

*Primary Examiner* — Moshe Wilensky
(74) *Attorney, Agent, or Firm* — Andrus Intellectual Property Law, LLP

(57) ABSTRACT

A method of assembling a trigger sprayer assembly includes providing an engine having a piston chamber and a fluid passage that is fluidly coupled to the piston chamber, the fluid passage extending from an input portion to an output portion. The method further includes inserting a piston component into the piston chamber, and coupling a trigger lever to the engine and the piston component. Pivoting the trigger lever relative to the engine pushes and pulls the piston component within the piston chamber to drive fluid from the input portion to the output portion of the fluid passage. The method further includes coupling a shroud to the engine, where the coupling comprises positioning a rail protrusion of the engine within a corresponding recess formed in the shroud, and inserting a shelf extending from an interior surface of the shroud into a pair of receiving clips extending from the engine.

13 Claims, 8 Drawing Sheets

(56) References Cited

U.S. PATENT DOCUMENTS

| | | | |
|---|---|---|---|
| 5,890,632 | A | 4/1999 | Chalupsky et al. |
| 5,975,376 | A | 11/1999 | Chelupsky et al. |
| 6,286,728 | B1 | 9/2001 | Driskell et al. |
| 9,975,130 | B2 | 5/2018 | Dejong et al. |
| 2018/0141065 | A1 | 5/2018 | Son |
| 2020/0030829 | A1 | 1/2020 | Kakuta |

OTHER PUBLICATIONS

PCT/US2022/023417, International Search Report and Written Opinion dated Jul. 7, 2022, 16 pages.

TRIGGER SPRAYER ASSEMBLY WITH IMPROVED ASSEMBLY PROCESS

CROSS-REFERENCE TO RELATED PATENT APPLICATION

The application claims the benefit of U.S. Provisional Application Ser. No. 63/170,688, filed Apr. 5, 2021, which is incorporated by reference herein in its entirety.

FIELD

The present disclosure relates to a trigger sprayer for dispensing liquids and more particularly to an improved method for assembling the trigger sprayer.

BACKGROUND

The average consumer likely has dozens of trigger sprayer containers in their home, but spares little thought to the complicated engineering that ensures that the trigger sprayer comfortably dispenses fluid without breaking, leaking, or exposing the consumer's fingers to dangerous moving parts. Previous trigger sprayer assemblies that met these criteria contained many small components that were difficult and time consuming to assemble. In addition, previous trigger sprayer assemblies were not generally designed for easy interchangeability of parts such as shrouds, trigger handles, and nozzles. A durable and attractive trigger sprayer assembly with interchangeable features that could be at least partially assembled through automated and/or robotic methods would therefore be useful.

SUMMARY

According to one embodiment of the present invention, a method of assembling a trigger sprayer assembly is provided where the component parts are designed with features to facilitate efficient assembly. The method includes providing an engine having a piston chamber and a fluid passage that is fluidly coupled to the piston chamber, the fluid passage extending from an input portion to an output portion. The method further includes inserting a piston component into the piston chamber, and coupling a trigger lever to the engine and the piston component. In use, the pivoting of the trigger lever relative to the engine pushes and pulls the piston component within the piston chamber to drive fluid from the input portion to the output portion of the fluid passage. The assembly method further includes coupling a shroud to the engine, where the coupling comprises positioning a rail protrusion of the engine within a corresponding recess formed in the shroud, and inserting a shelf extending from an interior surface of the shroud into a pair of receiving clips extending from the engine.

According to another embodiment of the present invention, a method of assembling a trigger sprayer assembly is provided where the components are designed to be assembled by moving parts along designated axes. The method includes providing an engine having a piston chamber and a fluid passage that is fluidly coupled to the piston chamber, the fluid passage extending from an input portion to an output portion. The method further includes inserting a piston component into the piston chamber by moving the piston component along a piston axis, and coupling a trigger lever to the engine and the piston component by moving the trigger lever along a trigger axis. Pivoting the trigger lever relative to the engine pushes and pulls the piston component within the piston chamber to drive fluid from the input portion to the output portion of the fluid passage. The method further includes coupling a shroud to the engine by moving the shroud along a nozzle axis. The piston axis, the trigger axis, and the nozzle axis are parallel to each other and at least one of inserting the piston component, coupling the trigger lever, and coupling the shroud is performed using a robotic assembly device.

BRIEF DESCRIPTION OF THE DRAWINGS

The present invention is described with reference to the following Figures. The same numbers are used throughout the Figures to reference like features and like components.

DETAILED DESCRIPTION

Figure 1:
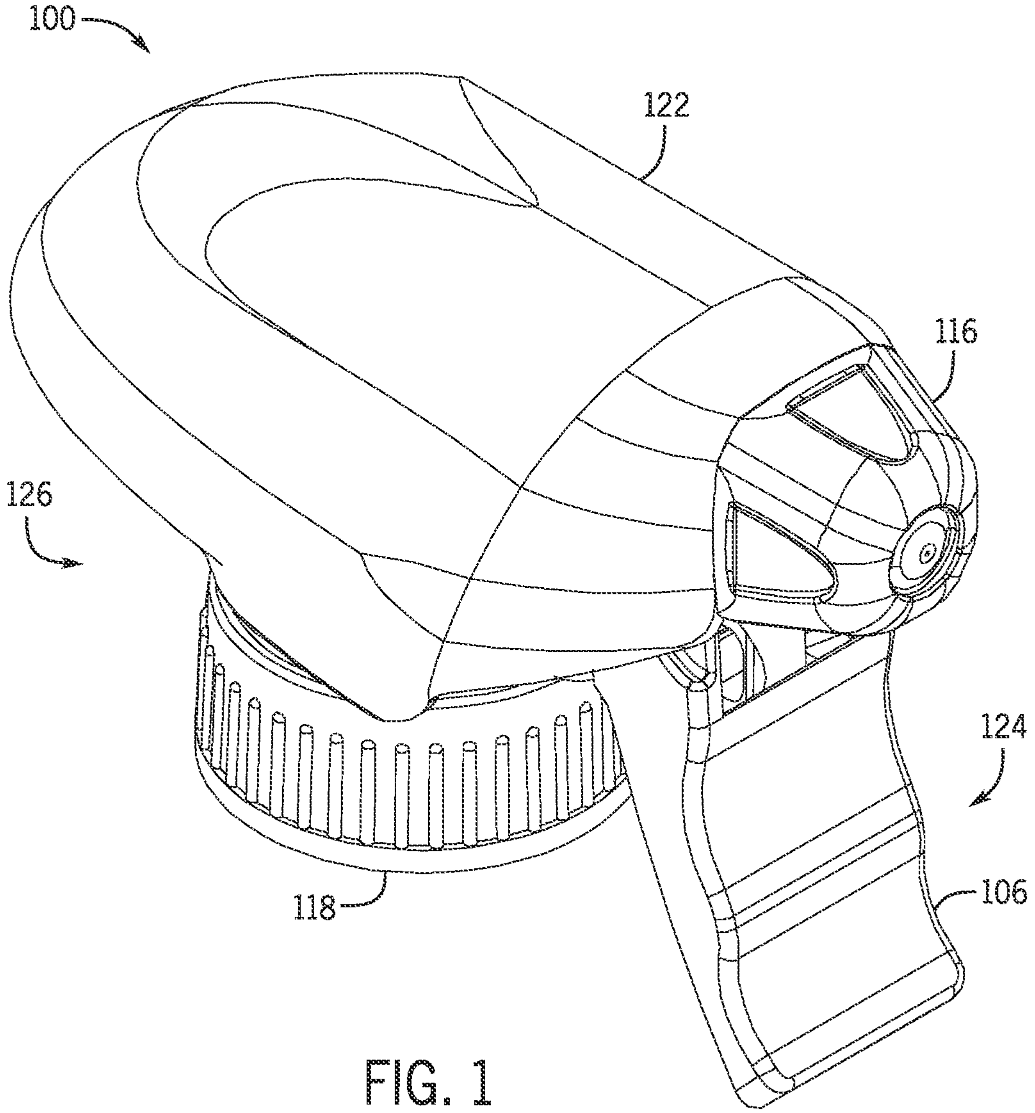
FIG. 1 is a perspective view of a trigger sprayer assembly according to an exemplary embodiment of the present disclosure.

FIG. 1 depicts an improved trigger sprayer assembly 100 assembled according to an exemplary implementation of the present invention. The trigger sprayer 100 may be adapted to dispense a fluid (e.g., cleaning products, industrial products, water, cosmetics, food products) housed within a bottle or container (not shown) in a stream, spray, or mist dispensing pattern. To operate the sprayer assembly 100, a user grips a trigger lever 106 at a front end 124 of the assembly 100, positioning a thumb at the joint between a neck closure 118, and a shroud 122 at a rear end 126 of the assembly 100. By depressing or squeezing the trigger lever 106 toward the rear end 126 from a relaxed or neutral position to a depressed or actuated position, fluid from the bottle or container is driven out through a nozzle 116. In an exemplary embodiment, the nozzle 116 is configured to rotate relative to the shroud 122 to permit a user to close or open a fluid passage that terminates at the nozzle 116, and to select a desired fluid dispensing pattern (e.g., stream, spray, mist).

Figure 2:
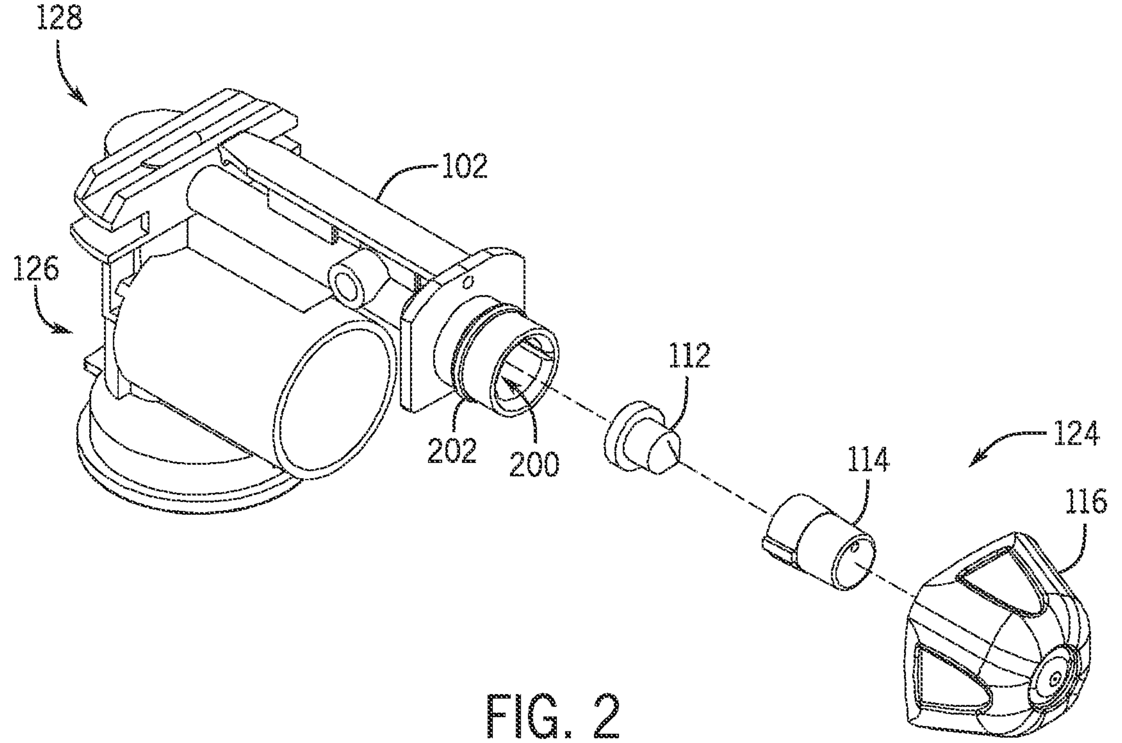
FIG. 2 depicts a step of installing an output valve, water jacket, and nozzle in an engine in a method of assembling the trigger sprayer assembly of FIG. 1.

Referring now to FIG. 2, an initial step 128 in a method of assembling the trigger sprayer assembly 100 is depicted. An engine component 102 functions as a base to receive and couple to other components of the trigger sprayer assembly 100. The engine 102 includes a piston chamber (e.g., piston chamber 300, described with reference to FIG. 3) that is fluidly coupled to a fluid passage 200. The fluid passage 200 extends from an input portion that is positioned near the bottle or container of fluid to an output portion from which the fluid is dispensed (e.g., input portion 500, output portion 502, depicted in FIG. 5).

Step 128 shown in FIG. 2 includes inserting an output or nozzle valve 112 and a water jacket 114 into the output portion of the fluid passage 200 along a horizontally-oriented nozzle axis that passes through a center of the fluid passage 200. The output valve 112 may be a one-way valve that is configured to only permit passage of fluid through the valve once a fluid pressure threshold is exceeded. In an exemplary embodiment, the output valve 112 is a dual slit valve fabricated from a flexible material (e.g., a thermoplastic elastomer), although any suitable type of one-way valve may be utilized. The water jacket 114 may be configured to fit over the output valve 112 and prevent leakage of fluid from the output portion of the fluid passage 200.

Step 128 further includes coupling a nozzle component 116 to the engine 102 by moving the nozzle component 116 along the nozzle axis. In an exemplary embodiment, this coupling includes use of a snap fit assembly process. The engine 102 is shown to include an external retention ridge 202 that fits within a recess in an interior region of the nozzle component 116 to retain the nozzle component 116 on the engine 102. By fitting the nozzle component 116 over the external retention ridge 202, the nozzle component 116 is also permitted to rotate relative to the engine 102 to permit a user a select a desired fluid dispensing pattern.

Figure 3:
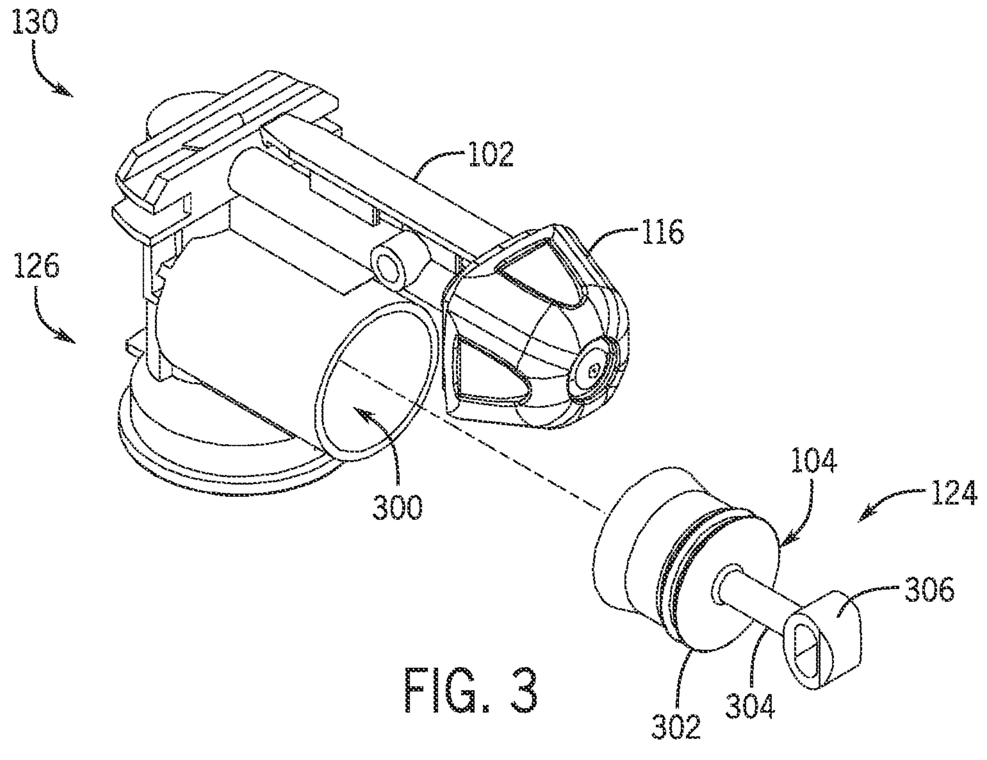
FIG. 3 depicts a step of installing a piston component in the engine in a method of assembling the trigger sprayer assembly of FIG. 1.

FIG. 3 depicts another step 130 in the method of assembling the trigger sprayer assembly 100. Step 130 includes inserting a piston component 104 into a piston chamber 300 of the engine 102 along a horizontally-oriented piston axis that passes through a center of the piston chamber 300. The piston component 104 is shown to include a plunger 302 connected to an end portion 306 by a piston rod 304. The plunger 302 is configured to reside entirely within the piston chamber 300, and movement of the plunger 302 within the piston chamber 300 drives fluid through the fluid passage 200. As the plunger 302 moves inwardly, or toward the rear end 126 of the assembly, the volume of the piston chamber 300 is decreased and fluid is driven out through output portion of the fluid passage 200. As the plunger 302 moves outwardly, or toward the front end 124 of the assembly, the volume of the piston chamber 300 is increased and fluid is drawn into the piston chamber from the input portion of the fluid passage 200.

Figure 4:
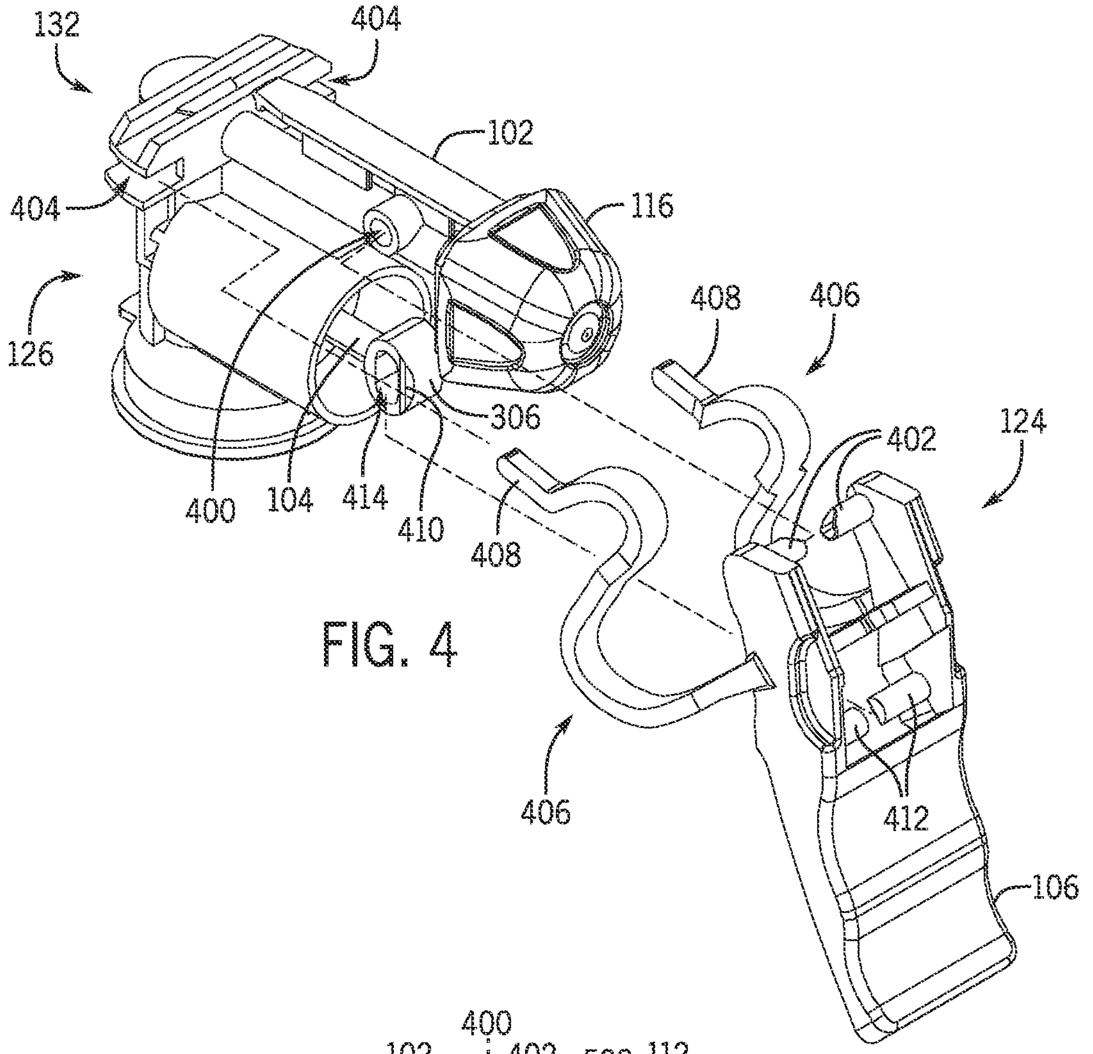
FIG. 4 depicts a step of installing a trigger component to the piston component and engine in a method of assembling the trigger sprayer assembly of FIG. 1.

Referring now to FIG. 4, the next step 132 for attaching a trigger lever component 106 to the engine 102 and the piston component 104 is depicted. The trigger lever component 106 includes multiple features that permit the trigger lever 106 to couple to the engine 102 and the piston component 104. For example, the trigger lever 106 includes a pair of pivot pins 402 that extend inwardly from sidewalls of the trigger lever 106 at an upper end of the trigger lever 106. The pivot pins 402 are configured to engage recesses 400 within the engine 102 such that the pivot pins 402 act as a pivot point for the trigger lever 106 to rotate relative to the engine 102. In an exemplary embodiment, the pivot pins 402 are semi-flexible or otherwise configured to flex relative to the sidewalls without fracture, and a sufficient lateral gap is provided between the pivot pins 402 to permit the pivot pins 402 to engage the pivot recesses 400 using a snap fit assembly process. The pivot pins 402 may further include chamfered or beveled lead-in surfaces that ease the ability of the pivot pins 402 to snap fit into the recesses 400 within the engine 102. In other embodiments, the locations of the pins and recesses may be reversed, with pivot pins extending from the engine 102 and configured to engage recesses formed at an upper end of the trigger lever 106.

The trigger lever 106 is further shown to include a pair of S-shaped springs 406. The springs 406 are configured to be compressed as the trigger lever 106 is moved from the neutral position to the depressed position. When a user releases the actuating force, the potential energy stored in the springs 406 causes the trigger lever 106 to return to the neutral position. Each of the springs 406 is shown to include a terminating portion 408. Each terminating portion 408 is configured to fit within a spring recess 404 formed at the rear end 126 of the engine 102 by moving the trigger lever 106 along a horizontally-aligned trigger axis that passes through a center of one of the terminating portions 408 of the springs 406. In this way, the terminating portions 408 of the springs 406 are constrained, while the remaining S-shaped portions of the springs are free to contract and expand with the motion of the trigger lever 106.

The trigger lever 106 is also shown to include a pair of piston coupling pins 412 that extend inwardly from the sidewalls of the trigger lever 106. The piston coupling pins 412 are configured to couple with an opening 410 in the end portion 306 of the piston component 104. This coupling of the trigger lever 106 to the piston component 104 couples the rotation of the trigger lever 106 to the movement of the plunger 302 within the piston chamber 300 such that rotation of the trigger lever 106 from the neutral position to the actuated position pushes the plunger 302 further into the piston chamber 300, and rotation of the trigger lever 106 from the actuated position to the neutral position pulls the plunger 302 outwardly within the piston chamber 300. In an exemplary embodiment, the piston coupling pins 412, like the pivot pins 402, are semi-flexible, and a sufficient lateral gap is provided between the piston coupling pins 412 to permit the pins 412 to engage the opening 410 in the end portion 306 using a snap fit assembly process. The piston coupling pins 412 may further include chamfered or beveled lead-in surfaces that ease the ability of the coupling pins 412 to snap fit in the opening 410. In an exemplary embodiment, the end portion 306 additionally includes chamfered surfaces 414 to ease the entry of the pins 412 into the opening 410. In another exemplary embodiment, the coupling features of the piston component 104 and the trigger lever 106 are reversed, with the piston component 104 including pins that fit into an opening formed in the trigger lever 106.

Figure 5:
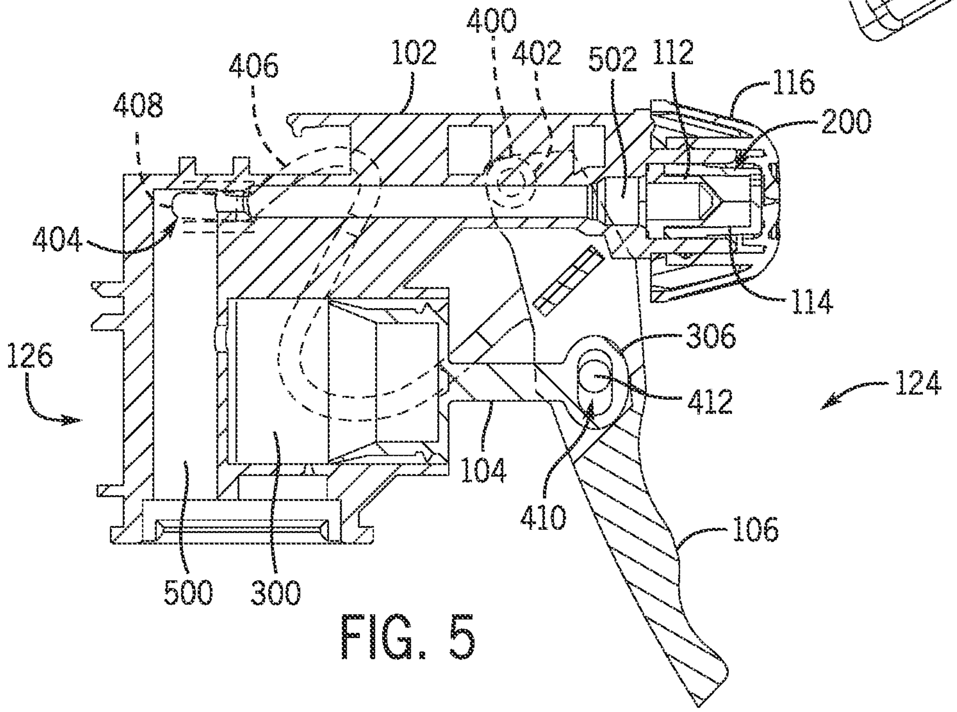
FIG. 5 depicts a side cross-sectional view of the partially-assembled trigger sprayer assembly after the step depicted in FIG. 4.

FIG. 5 depicts a cross-sectional view of the partially-assembled trigger sprayer assembly 100 upon the completion of step 132. As shown and described above, the fluid passage 200 formed in the engine 102 extend from an input portion 500 to and output portion 502. The output valve 112, water jacket 114, and nozzle component 116 are positioned proximate the output portion 502 to control a flow of fluid exiting the trigger sprayer assembly 100.

Figure 6:
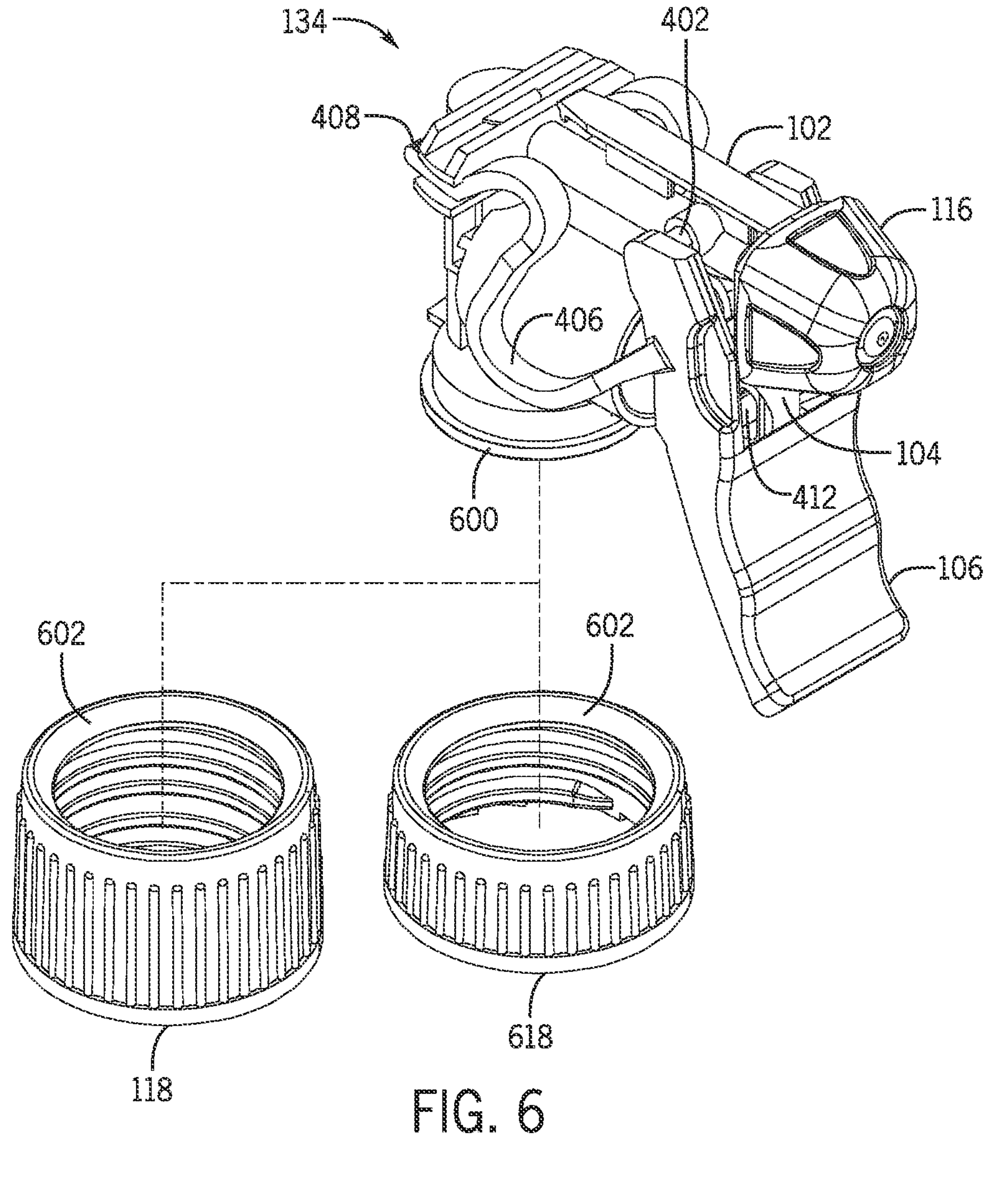
FIG. 6 depicts a step of installing the engine to a neck closure in a method of assembling the trigger sprayer assembly of FIG. 1.

FIG. 6 depicts the step 134 of coupling the engine 102 to a neck closure component 118, 618 by moving the engine 102 along a vertically-oriented neck closure axis that passes through a center of the neck closure component 118, 618. The neck closure components 118, 618 are configured to be utilized to couple the engine 102 to any desired bottle or container (not shown) and may be utilized interchangeably. Accordingly, the dimensions of the neck closure component 118, 618 (e.g., height, outer diameter, inner diameter) may be variable based on the size and shape of the bottle or container housing the liquid to be dispensed. In an exemplary embodiment, the neck closures 118, 618 include threads and are configured to be threadably coupled to a neck portion of the bottle or container. Each of the neck closures 118, 618 is shown to include a retaining flange 602 that is configured to engage with an external flange 600 formed at a lower end of the engine 102. The engine 102 can be coupled to one of the neck closures 118, 618 using a snap fit assembly process such that the retaining flange 602 resides atop of the external flange 600 and prevents disassembly of the engine 102 from the neck closure 118, 618.

Figure 7:
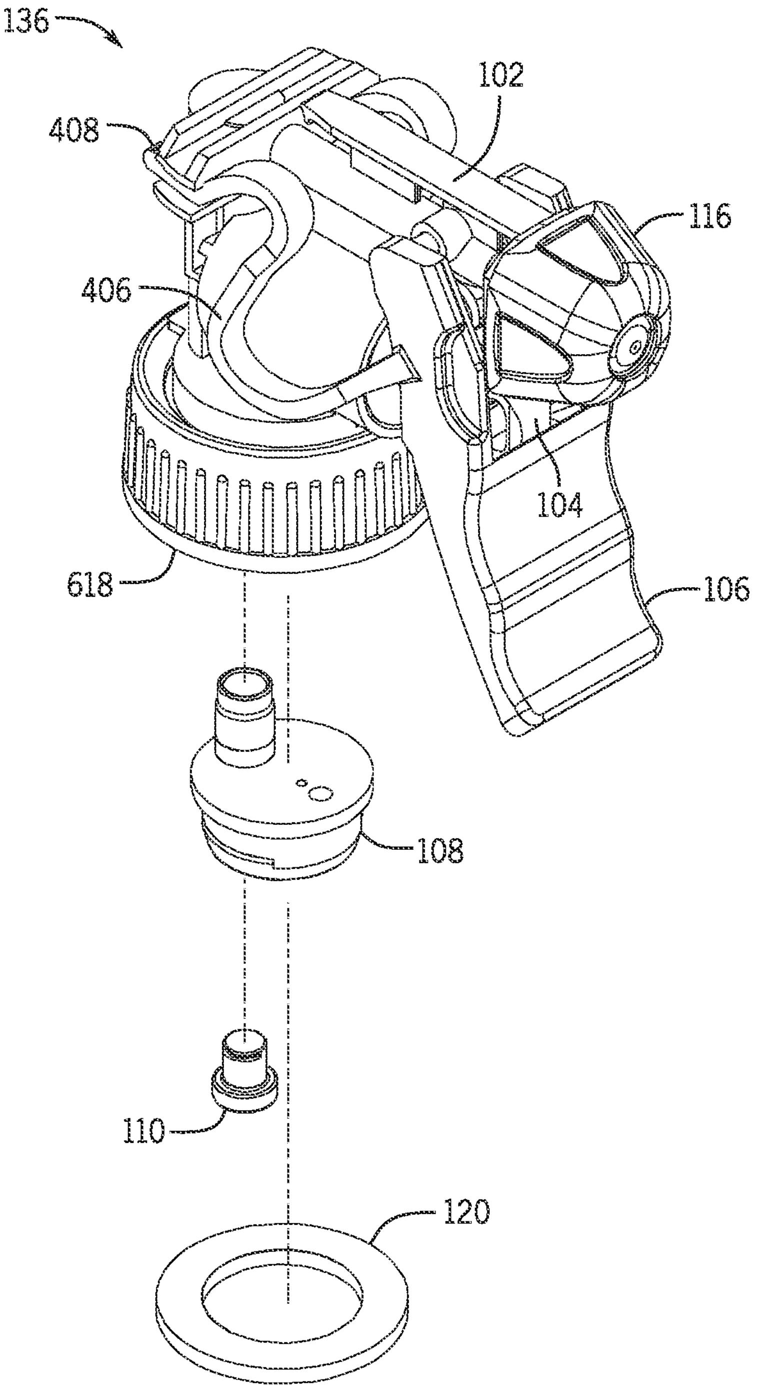
FIG. 7 depicts a step of installing an input housing, input valve, and sealing gasket in the engine in a method of assembling the trigger sprayer assembly of FIG. 1.

Turning now to FIG. 7, the next step 136 in the method of assembling the trigger sprayer assembly 100 includes coupling an input housing 108 and an input valve 110 to the engine 102 by moving the input housing 108 and the input valve 110 along a vertically-oriented input axis that passes through a center of the input portion 500 (see FIG. 5) of the engine 102. Step 136 further includes coupling the sealing gasket 120 to the engine 102 proximate the input portion 500 of the fluid passage 200 by moving the sealing gasket 120 along the neck closure axis. The input housing 108 may be configured to couple to a dip tube (not shown) that extends into the bottle or container of fluid and provides a path for the fluid to be drawn upwards into the sprayer assembly 100. The input housing 108 also provides a seat for the one-way input valve 110 that regulates a flow of fluid into the engine 102.

In the shown exemplary embodiment, the input valve 110 has a generally cylindrical shape with a movable flap at an upper end. The input valve 110 may be fabricated from a flexible material (e.g., a thermoplastic elastomer) such that when fluid pressure within the dip tube exceeds a certain threshold, the movable flap lifts upwardly, permitting fluid to flow through the dip tube and into the engine 102. However, in other embodiments, any suitable style of one way valve (e.g., a ball valve) may be utilized. The sealing gasket may be configured to ensure that fluid does not seep between the engine 102 and the input housing 108, and out through the neck closure (e.g., neck closure 618), particularly in the case if the trigger sprayer assembly 100 is tilted or inverted.

Figure 8:
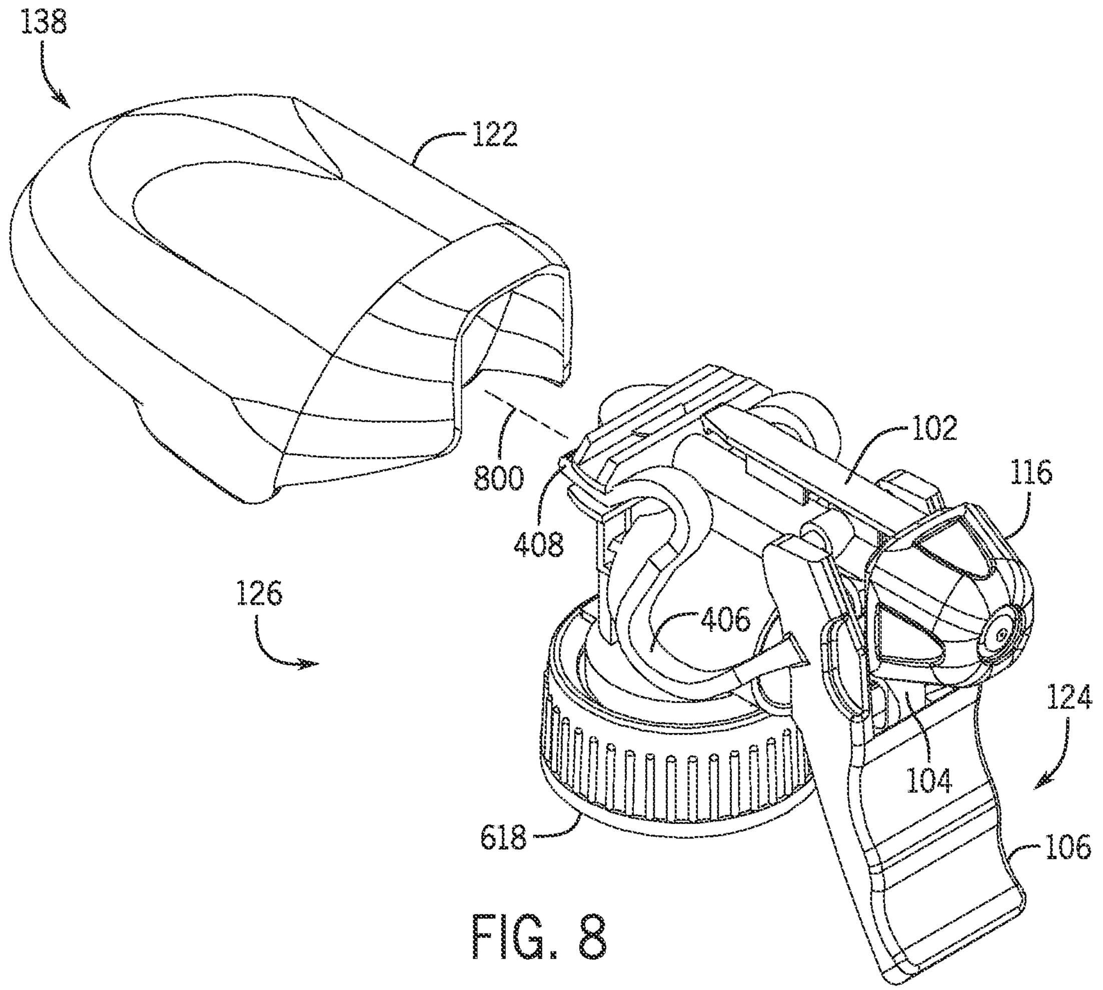
FIG. 8 depicts a step of installing a shroud to the engine in a method of assembling the trigger sprayer assembly of FIG. 1.
Figure 9:
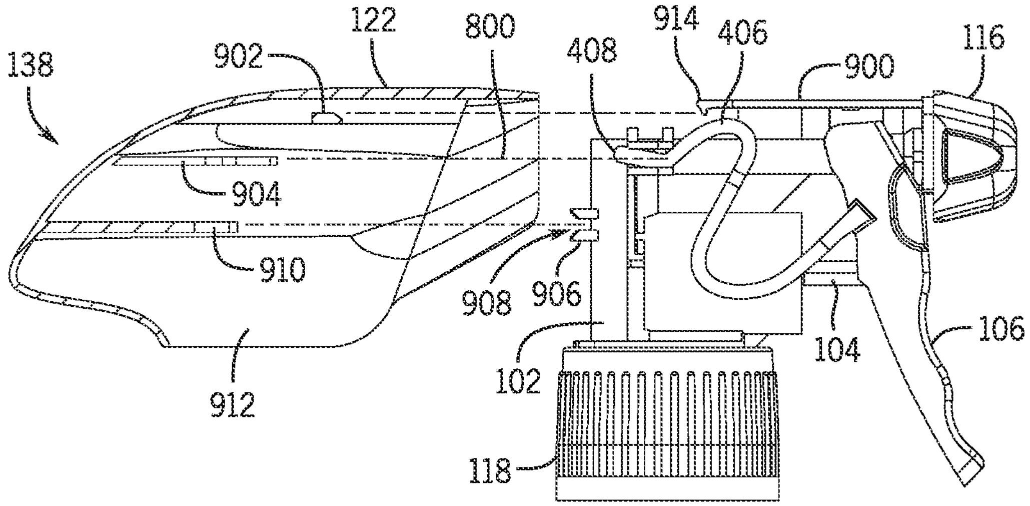
FIG. 9 depicts a side cross-sectional view of the partially-assembled trigger sprayer assembly during the step depicted in FIG. 8.
Figure 10:
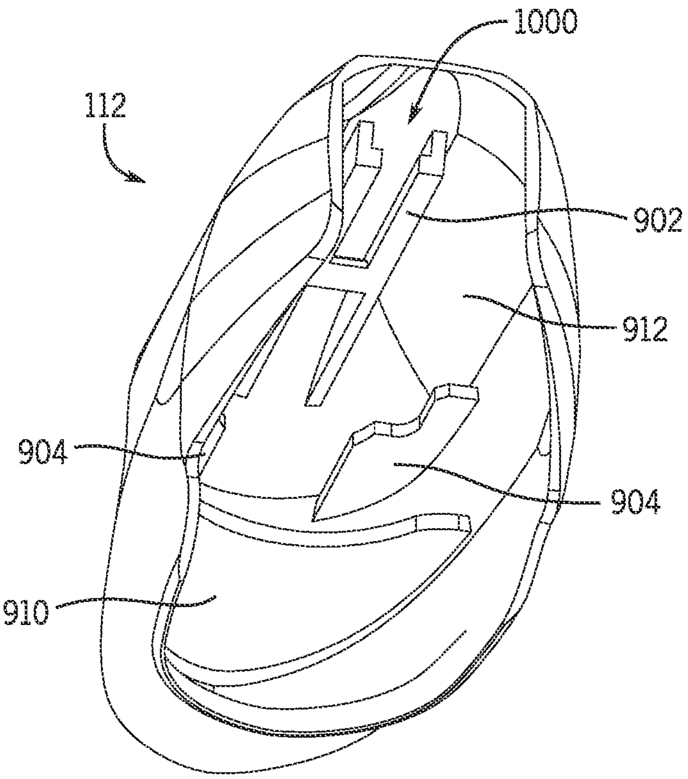
FIG. 10 depicts a perspective view of the coupling features of the shroud utilized in the trigger sprayer assembly of FIG. 1.
Figure 11:
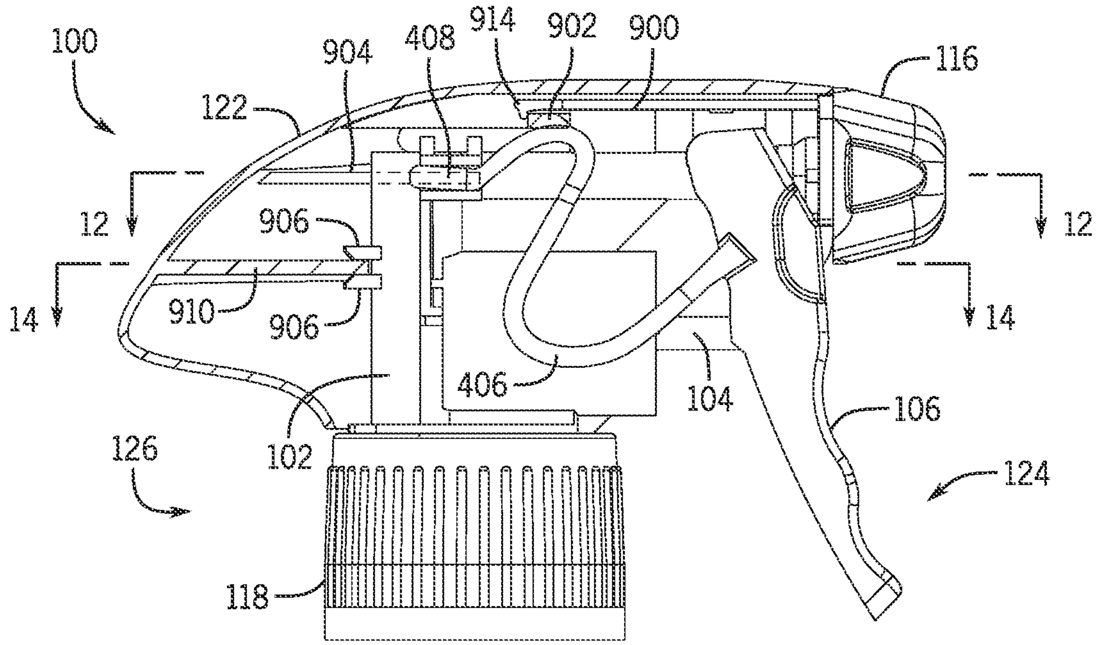
FIG. 11 depicts a side cross-sectional view of the assembled trigger sprayer assembly of FIG. 1.

FIGS. 8 and 9 depict the final step 138 in the method of assembling the trigger sprayer assembly 100. Step 138 includes coupling a shroud 122 to the engine 102 by moving the shroud forwardly from a rear end 126 of the assembly toward a front end 124 along a horizontally-oriented shroud axis 800. Multiple features (some best depicted in the perspective view of the shroud 122 included in FIG. 10) act to retain the shroud 122 on the engine 102 and prevent disassembly. For example, a retention ledge 902 is shown to extend downwardly from an interior surface 912 of the shroud 122. The retention ledge 902 defines a recess 1000 (depicted in FIG. 10) that is configured to receive a rail protrusion 900 positioned an upper end of the engine 102. In an exemplary embodiment, the rail protrusion 900 terminates in a latch portion 914 that is configured to fit over the retention ledge 902 (see FIG. 11) and inhibit movement of the shroud 122 toward the rear end 126 of the assembly 100.

Figure 12:
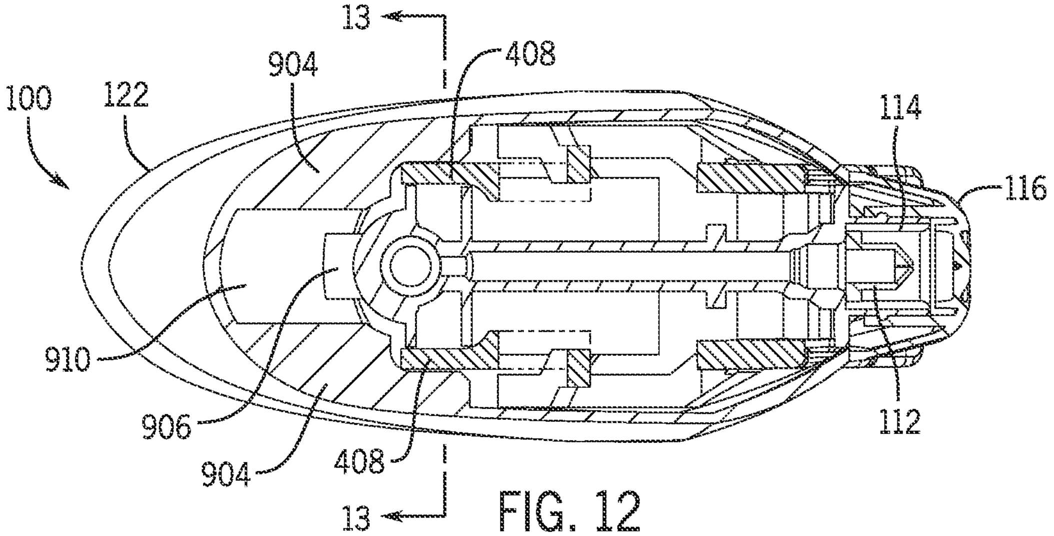
FIG. 12 depicts a top cross-sectional view of the assembled trigger sprayer assembly taken along the line 12-12 of FIG. 11.
Figure 13:
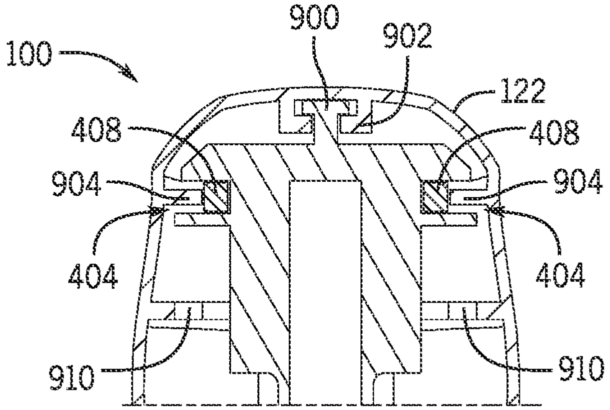
FIG. 13 depicts a front cross-sectional view of the assembled trigger sprayer assembly taken along the line 13-13 of FIG. 12.
Figure 14:
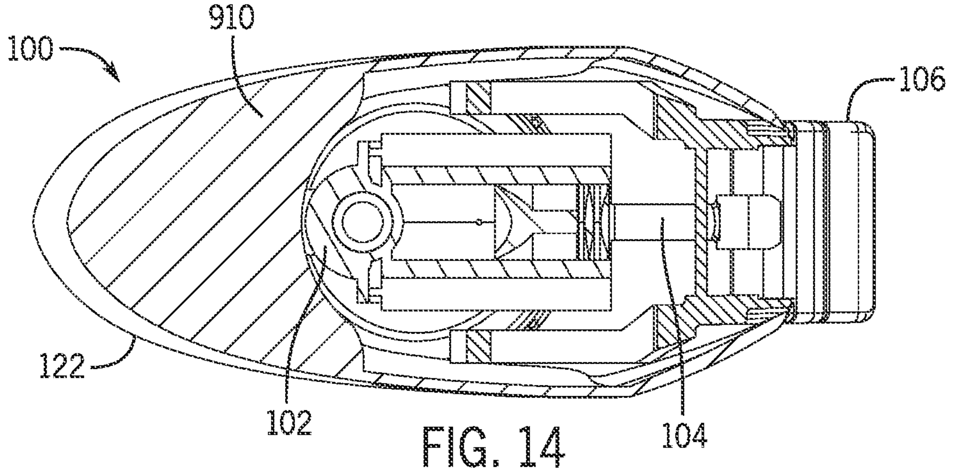
FIG. 14 depicts another top cross-sectional view of the assembled trigger sprayer assembly taken along the line 14-14 of FIG. 11.

The shroud 122 is further shown to include middle shelves 904 and a lower shelf 910 extending from the interior surface 912 in a generally horizontal direction that is oriented parallel to the horizontal shroud axis 800 (depicted in FIGS. 8 and 9) utilized to align the shroud 122 relative to the engine 102. The middle shelves 904 are configured to fit around the terminating portions 408 of the trigger springs 406 and into the spring recesses 404 formed in the engine 102 (see FIGS. 12 and 13) such that lateral movement of the terminating portions 408 is constrained as the trigger springs 406 contract and expand with the movement of the trigger lever 106. The lower shelf 910 is configured to fit within a recess 908 formed between a pair of receiving clips 906 extending from the engine 102 (see FIGS. 9, 11, and 14) to inhibit movement at a lower end of the shroud 122 as a user grasps the assembled trigger sprayer assembly 100 (depicted in FIG. 11). Advantageously, the coupling features provided in the shroud 122 may be incorporated into various shroud embodiments having a wide variety of external shapes and contours, allowing manufacturers to easily modify the overall appearance of the trigger sprayer assembly 100.

One or more steps 128-138 in assembling the trigger sprayer assembly 100 may be performed using an automated assembly process, in other words, utilizing pneumatic robotic devices to insert and couple various components to each other. Advantageously, several steps in the assembly method, for example, step 128 (coupling the output valve 112, water jacket 114, and nozzle component 116 to the engine 102), step 130 (coupling the piston component 104 to the engine 102), step 132 (coupling the trigger lever 106 to the engine 102 and piston component 104) and step 138 (coupling the shroud 122 to the engine 102) involve moving components along parallel horizontal axes relative to the engine 102, movement which is well-suited to assembly using a robotic device. In addition, step 134 (coupling the engine 102 to a neck closure 118, 612) and step 136 (coupling the input housing 108, input valve 110, and sealing gasket 120 to the engine 102) involve moving components along parallel vertical axes relative to the engine 102 that are orthogonal to the horizontal axes, movement which is likewise well-suited to assembly using a robotic device. By limiting the movement of components during the assembly process in this way, assembly time and automated tooling complexity is reduced.

Various equivalents, alternatives and modifications are possible within the scope of the appended claims.

What is claimed is:

1. A method of assembling a trigger sprayer assembly, comprising:

providing an engine having a piston chamber and a fluid passage that is fluidly coupled to the piston chamber, the fluid passage extending from an input portion to an output portion;

inserting a piston component into the piston chamber;

coupling a trigger lever to the engine and the piston component, wherein pivoting the trigger lever relative to the engine pushes and pulls the piston component within the piston chamber to drive fluid from the input portion to the output portion of the fluid passage; and coupling a shroud to the engine, wherein the coupling comprises:

positioning a rail protrusion of the engine within a corresponding recess formed in the shroud; and inserting a shelf extending from an interior surface of the shroud into a pair of receiving clips extending from the engine; and wherein the trigger lever comprises a pair of trigger springs, and coupling the trigger lever to the engine comprises inserting a terminating end of each of the pair of trigger springs into one of a pair of spring recesses formed in the engine; and further wherein the shroud comprises a pair of spring retaining ledges extending from an interior surface of the shroud, each of the pair of spring retaining ledges configured to fit into the spring recess of the engine to constrain lateral movement of the terminating ends of the trigger springs.

2. The method of claim 1, wherein the trigger lever comprises a pair of pivot pins, and wherein coupling the trigger lever to the engine comprises inserting each of the pivot pins into a pivot recess of the engine.

3. The method of claim 1, wherein the trigger lever comprises a pair of piston coupling pins, and wherein coupling the trigger lever to the piston component comprises inserting each of the piston coupling pins into a coupling recess of the piston component.

4. The method of claim 1, further comprising coupling a nozzle to the engine proximate the output portion of the fluid passage using a snap fit assembly process.

5. The method of claim 1, further comprising coupling a neck closure to the engine proximate the input portion of the fluid passage using a snap fit assembly process.

6. A method of assembling a trigger sprayer assembly, comprising:

providing an engine having a piston chamber and a fluid passage that is fluidly coupled to the piston chamber, the fluid passage extending from an input portion to an output portion;

inserting a piston component into the piston chamber by moving the piston component along a piston axis;

coupling a trigger lever to the engine and the piston component by moving the trigger lever along a trigger axis, wherein pivoting the trigger lever relative to the engine pushes and pulls the piston component within the piston chamber to drive fluid from the input portion to the output portion of the fluid passage; and coupling a shroud to the engine by moving the shroud along a shroud axis;

wherein the trigger lever comprises a pair of trigger springs, and coupling the trigger lever to the engine comprises inserting a terminating end of each of the pair of trigger springs into one of a pair of spring recesses formed in the engine; and further wherein the shroud comprises a pair of spring retaining ledges extending from an interior surface of the shroud, each of the pair of spring retaining ledges configured to fit into the spring recess of the engine to constrain lateral movement of the terminating ends of the trigger springs;

wherein the piston axis, the trigger axis, and the shroud axis are parallel to each other; and wherein at least one of inserting the piston component, coupling the trigger lever, and coupling the shroud is performed using a robotic assembly device.

7. The method of claim 6, further comprising inserting an output valve into the output portion of the fluid passage by moving the output valve along a nozzle axis, wherein the nozzle axis is parallel to the piston axis, the trigger axis, and the shroud axis.

8. The method of claim 7, further comprising coupling a nozzle to the engine proximate the output portion of the fluid passage using a snap fit assembly process by moving the nozzle along the nozzle axis.

9. The method of claim 6, further comprising inserting an input valve into the input portion of the fluid passage by moving the input valve along an input axis.

10. The method of claim 9, further comprising coupling a neck closure to the engine proximate the input portion of the fluid passage using a snap fit assembly process by moving the neck closure along a neck closure axis.

11. The method of claim 10, wherein the input axis and the neck closure axis are parallel to each other.

12. The method of claim 6, wherein coupling the shroud to the engine comprises:

positioning a rail protrusion of the engine within a corresponding recess formed in the shroud; and inserting a lower shelf extending from an interior surface of the shroud into a pair of receiving clips extending from the engine.

13. The method of claim 6, wherein coupling the shroud to the engine comprises inserting each of a pair of middle shelves extending from the interior surface of the shroud into one of the pair of spring recesses formed in the engine.

* * * * *